United States Patent [19]

McDonald

[11] 4,262,796
[45] Apr. 21, 1981

[54] CONVEYOR CHAIN AND TROLLEY ASSEMBLY
[75] Inventor: Clayton C. McDonald, Howell, Mich.
[73] Assignee: Jervis B. Webb Company, Farmington Hills, Mich.
[21] Appl. No.: 11,036
[22] Filed: Feb. 9, 1979
[51] Int. Cl.³ .............................................. B65G 17/32
[52] U.S. Cl. ................................................... 198/687
[58] Field of Search ............... 198/687, 682, 678, 685, 198/733, 731; 74/245 C, 250 C, 251 C, 288

[56] References Cited
U.S. PATENT DOCUMENTS

| 1,721,759 | 7/1929 | Webb | 198/687 |
| 2,075,261 | 3/1937 | Bishop | 198/687 |

FOREIGN PATENT DOCUMENTS 941596  3/1956  Fed. Rep. of Germany ........... 198/731

Primary Examiner—Robert B. Reeves
Assistant Examiner—Douglas D. Watts
Attorney, Agent, or Firm—Joseph W. Farley

[57] ABSTRACT

In a conveyor chain and trolley assembly consisting of a chain center link having an open central portion through which the bases of a pair of trolley brackets extend, an interlocking connection is provided for preventing relative movement between the center link and trolley brackets. A pair of bosses are formed on the sides of the center link and project inwardly into the open central portion medially between the ends of the center link. Complimentary shaped recesses on the bases of the pair of trolley brackets are positioned in interlocking engagement with the pair of bosses by an attachment member which is mounted between and is connected to the bases of the pair of trolley brackets. In an alternative construction, only the attachment member extends through the open central portion of the center link and is provided with grooves engaged by the pair of bosses.

8 Claims, 11 Drawing Figures

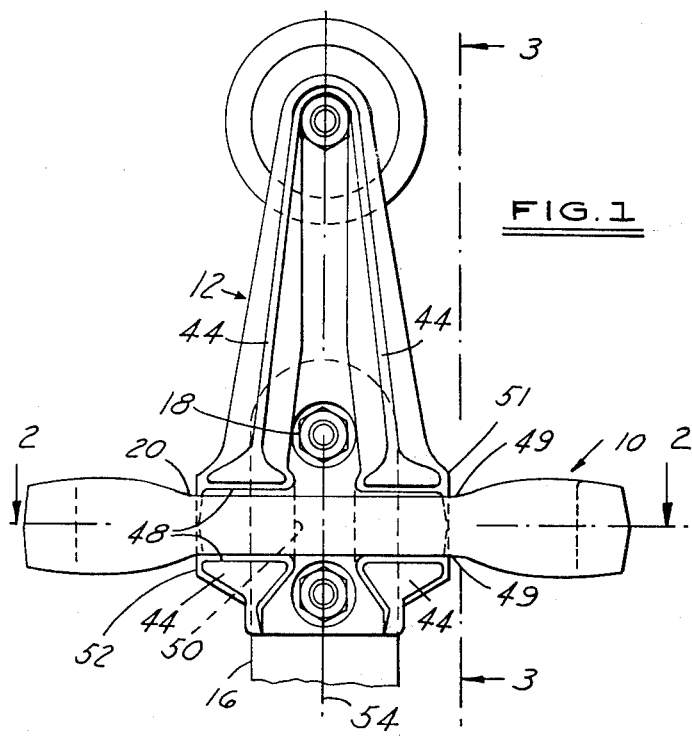
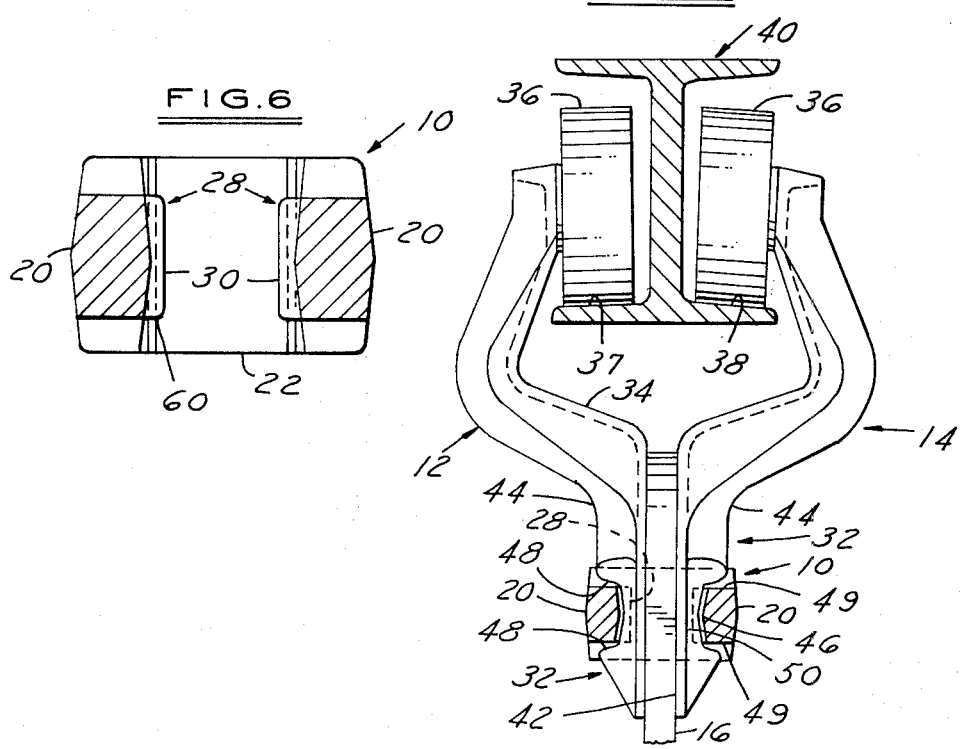

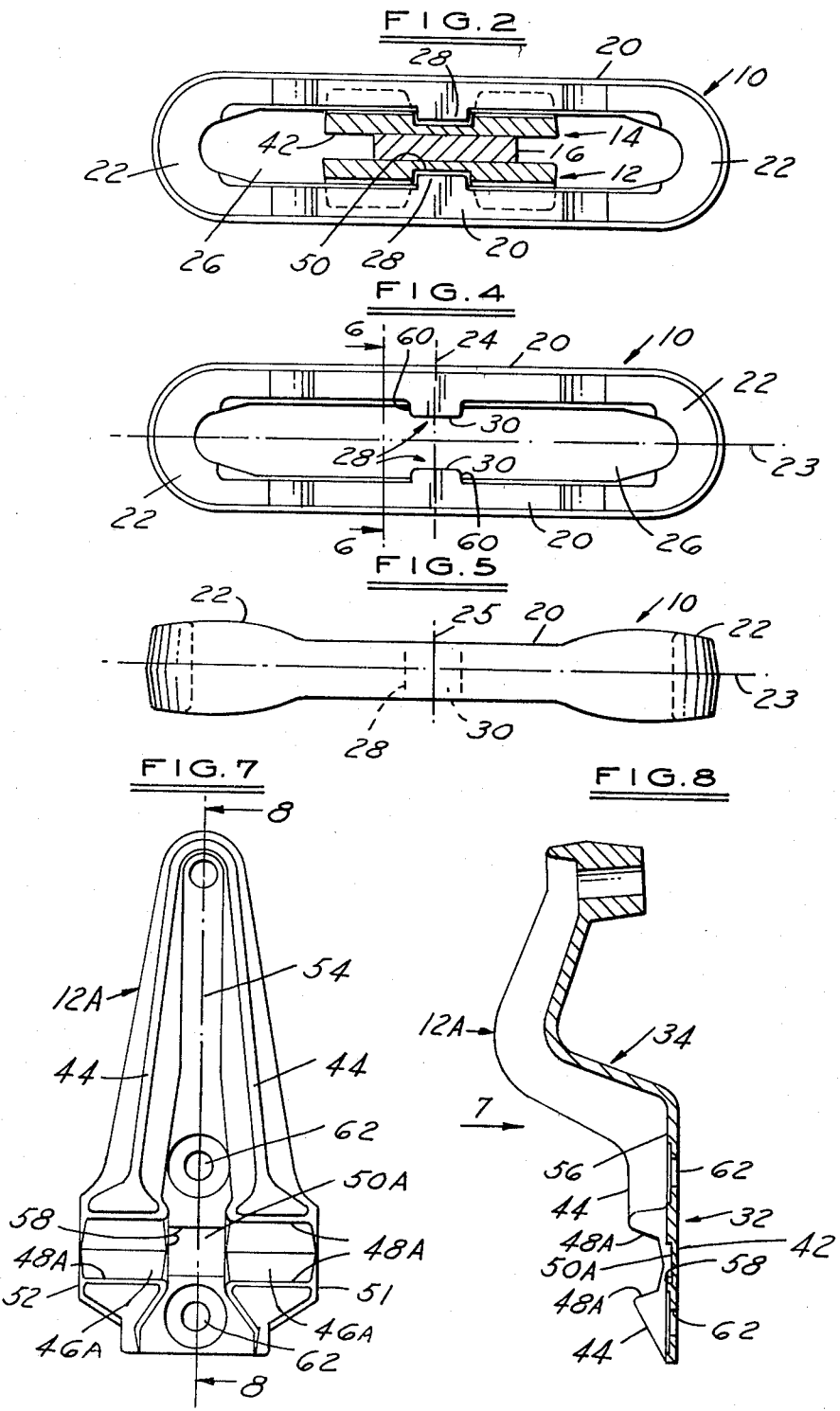

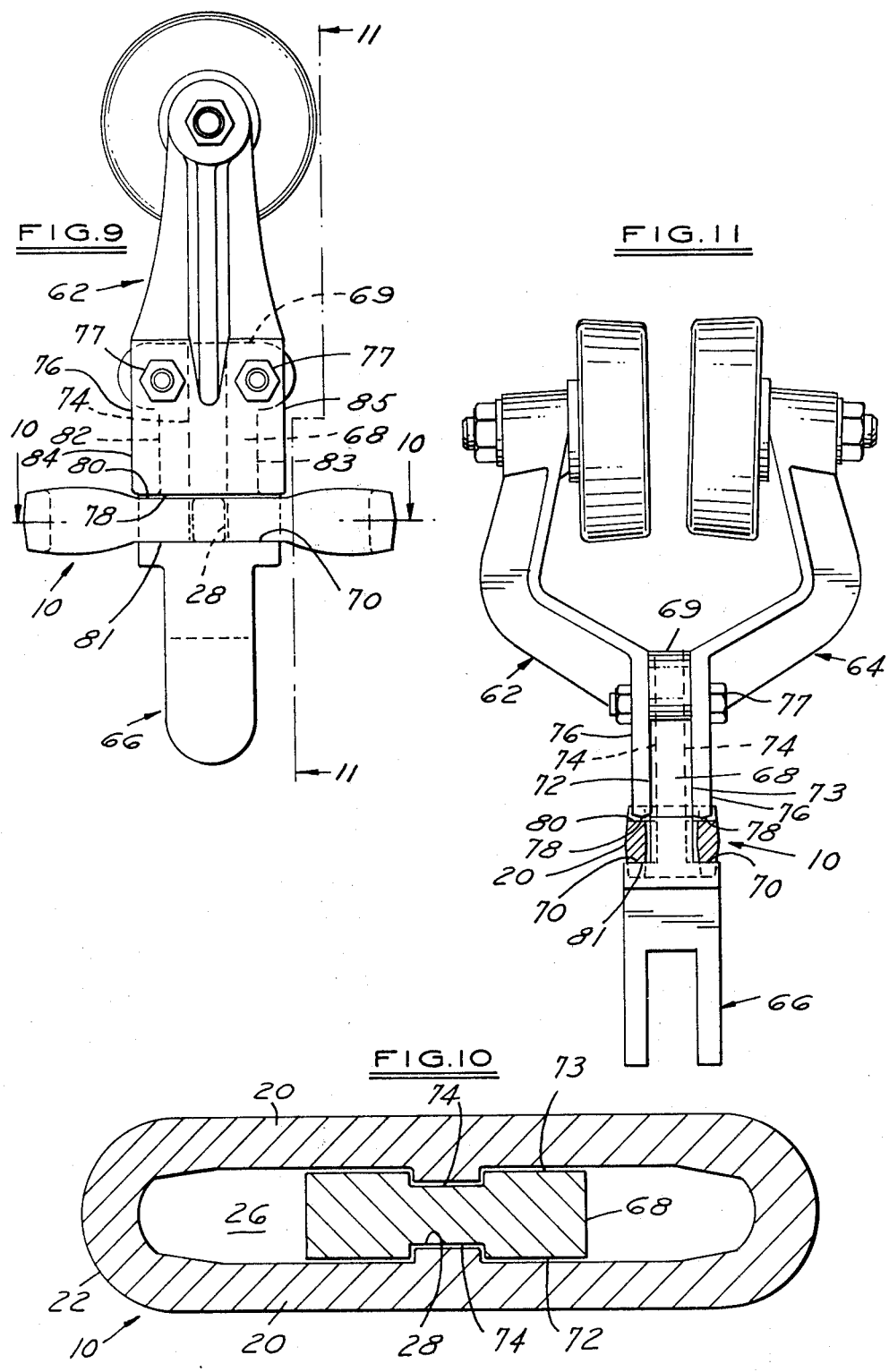

CONVEYOR CHAIN AND TROLLEY ASSEMBLY

This invention relates to an improved construction for a conveyor chain and trolley assembly of the type employed in endless chain conveyors in which the chain is supported by trolley travelling on a track.

In conventional constructions of this type, the endless chain is composed of alternate center links and pairs of side bars connected together by pins, the track is an I-section beam, and each of the trolleys consists of a pair of brackets, which form a yoke-shaped unit having a pair of arms and a base portion. Wheels mounted on the pair of arms engage the lower flanges of the I-section track; and, the base of the unit is connected to a center link of the endless chain, thus forming a chain and trolley assembly which suspends the chain from the track.

A conventional center link of the chain has an open central portion defined or bordered by pairs of side and end portions. In one commonly employed connection between a pair of trolley brackets and a center link, the base portions of the brackets extend through the open central portion of the center link and are provided with channel-shaped grooves which loosely engage the side portions of the center link when an attachment member is inserted between and connected to the base portion of the brackets.

Another common connection employs an attachment member provided with a stem which extends through the open central portion of the center link and to which the base portions of the trolley brackets are connected on one side of the center link. Grooves loosely engaged by the side portions of the center link are defined on one side thereof by the ends of the base portions of the trolley brackets and on the other side of the center link by transversely extending shoulders at the inner end of the stem of the attachment member.

Each of these common connections permits a certain amount of relative sliding movement between the center link and brackets. Such relative sliding movement, which can be caused by many factors in the operation of a conveyor, results in damaging and costly failures due to wear on and localized stresses in both the center link and the trolley brackets.

Prior constructions which would prevent or limit relative sliding movement between a conveyor chain center link and a pair of trolley brackets are found in Bishop U.S. Pat. No. 2,095,022 and Webb et al, U.S. Pat. No. 2,644,571. The Bishop construction employs a specially formed chain center link having a solid central portion bordered by outwardly facing recesses in the sides of the center link; and, the base portions of the trolley brackets extend around the center link and are fitted into the recesses. The provision of the solid central portion in the Bishop center link requires that the thickened end portions thereof be cut away in order to carry out the operation of connecting the center link to pairs of chain side bars. While the Bishop construction would serve to limit relative longitudinal sliding movement between the center link and the pair of trolley brackets, it increases the areas as which potentially damaging localized stresses can develop—particularly at the areas of engagement between the trolley brackets and the center link at the ends of the recesses in the center link, and at the areas of engagement between the center link and each pair of side bars at the ends of the center link.

The side edges of the trolley brackets in the construction of the Webb et al patent fit between raised projections on the side portions of the center link. Relative longitudinal sliding movement between the center link and trolley brackets is thereby limited, but areas of stress concentration and potential failure are created where the trolley brackets engage the raised projections.

The overall objects of the present invention are to provide a conveyor chain and trolley assembly which includes an interlocking connection between the chain center link and the trolley brackets or the attachment member so as to restrict all relative movement therebetween without creating areas of stress concentration, and which assembly employs presently standardized forms of component parts to the greatest possible extent.

A conveyor chain and trolley assembly of the invention consists of a chain center link having pairs of side and end portions symmetrically formed about longitudinal and transverse center lines and defining an open central portion, a pair of trolley brackets each having a base portion adapted to extend through the open central portion of the center link, and an attachment member mounted between and connected to the base portions of the pair of trolley brackets, the attachment member extending through the open central portion of the center link and positioning spaced shoulders on the base portions of the trolley brackets in engagement with the side portions of the center link. The foregoing construction is distinguished by the improvement wherein a pair of bosses are provided on the pair of side portions of the center link and project from the side portions into the open central portion, the bosses being located medially between the end portions of the center link and having faces which are opposed to each other in spaced relation between the side portions of the center link; and, wherein the base portion of each of the pair of trolley brackets is provided with recess means for interlockingly connecting the trolley brackets and the center link, each recess means complimenting one of the bosses and being adapted to be positioned in engagement therewith by said attachment member.

An alternative conveyor chain and trolley assembly of the invention employs an attachment member having a stem end portion which extends through the open central portion of the center link and which has oppositely facing sides spaced apart a distance slightly less than the width of the open central portion. The recess means comprise a groove formed in each of the oppositely facing sides of the stem end portion, the grooves being interlockingly engageably by the pair of bosses on the center link. In this alternative assembly, the base portions of the trolley brackets are connected to the stem end portion of the attachment member on one side of the center link and the ends of the base portions are engageable by this one side, while the opposite side of the center link is engageable by transversely extending shoulders on the attachment member.

The improved constructions require minimum modifications to conventional components of a conveyor chain and trolley assembly, yet afford an interlocked connection which reduces wear without creating additional areas of potential failure due to stress concentrations. These and other features and advantages of the invention will be further explained in the description to follow of the presently preferred embodiments of the invention shown in the accompanying drawings.

DESCRIPTION OF THE DRAWINGS

FIG. 1 is a side elevation of a conveyor chain and trolley assembly according to the invention;

FIG. 2 is a sectional plan view taken on the line 2—2 of FIG. 1;

FIG. 3 is a transverse sectional elevation taken as indicated by the line 3—3 of FIG. 2;

FIG. 4 is a plan view of a conveyor chain center link according to the invention;

FIG. 5 is a side elevation of the center link of FIG. 4;

FIG. 6 is a sectional elevation taken on the line 6—6 of FIG. 4;

FIG. 7 is a side elevation of a modified trolley bracket of the invention, taken as indicated by the arrow 7 of FIG. 8;

FIG. 8 is a sectional elevation taken on the line 8—8 of FIG. 7;

FIG. 9 is a side elevation of an alternative conveyor chain and trolley assembly of the invention;

FIG. 10 is a sectional plan view taken on the line 10—10 of FIG. 9; and,

FIG. 11 is a transverse sectional elevational taken on the line 11—11 of FIG. 9.

DESCRIPTION OF THE PREFERRED EMBODIMENTS

Referring to FIGS. 1-3, the conveyor chain and trolley assembly consists of a chain center link 10, a pair of trolley brackets 12 and 14 and an attachment member 16 which is connected to the trolley brackets by bolts 18.

The center link 10 shown in detail in FIGS. 4-6 has a pair of side portions 20 and a pair of end portions 22 formed symmetrically about longitudinal and transverse center lines 23, 24 and 25. An open central portion 26 is defined or bordered by the portions 20 and 22. A pair of bosses 28 are provided on and are integrally formed with the side portions 20 and project therefrom into the open central portion 26, as best shown in FIGS. 4 and 6. The bosses 28 are located medially between the end portions 22, extend symmetrically on either side of the transverse center lines 24 and 25, and have inner faces 30 which are opposed to each other transversely of the center link 10. Preferably, the center link 10 is made in one piece by forging techniques.

As shown in FIG. 3, the pair of trolley brackets 12 and 14, when assembled, form a Y-shaped unit with each of the brackets having a stem or base portion 32 adapted to extend through the open central portion 26 of the center link 10, and having an upper arm portion 34 which carries a wheel 36 adapted to engage one of the lower flanges 37 and 38 and an I-section conveyor track 40. The trolley brackets 12 and 14 are identical and are also preferably forgings.

Further details of the construction of each of the trolley brackets 12 appear in FIGS. 1-3. The base portion 32 has an inner face 42, which is a planar surface adapted to be engaged by the attachment member 16, and has an outer face which includes reinforcing ribs 44 interrupted and enlarged to form channel-shaped grooves 46 having shoulders 48 adapted to engage oppositely facing surfaces 49 on one of the side portions 20 of the center link 10, as shown in FIGS. 1 and 3. A recess 50, shaped to compliment and receive one of the bosses 28 on the center link 10, is provided on the base portion 32 and is located midway between the side edges 51 and 52 thereof in centered relation to the grooves 46. As appears from FIG. 1, the recess 50 is symmetrical to a longitudinal vertical center line 54 of the trolley bracket 12, and the bolts 18 are also located on this center line 54. The grooves 46 and the enlarged shoulders 48 are symmetrical to the center line 54 and extend substantially from the recess 50 to the side edges 51 and 52 of the base portion 32.

The conveyor chain and trolley assembly of FIGS. 1-3 is put together by successively inserting the base portions 32 of the trolley brackets 12 and 14 through the central portion 26 of the center link and displacing each bracket transversely of the link so that the side portion 20 thereof are engaged in the grooves 46 between the shoulders 48 on the brackets. Then, the insertion of the attachment member 16 between the inner faces 42 of the brackets positions the recesses 50 on the brackets in interlocking engagement with the bosses 28 on the side portions 20 of the center link 10. This interlocking engagement restricts relative movement between the center link 10 and the trolley brackets 12 and 14 and is maintained by securing the brackets 12 and 14 and the attachment member 16 together with the bolts 18.

Forming the bosses 28 medially of the center link 10 and the recesses 50 medially between the side edges 51 and 52 of the trolley brackets 12 and 14, as previously described, locates the connection resulting from the interlocking engagement of the bosses 28 and recesses 50 on neutral axes extending longitudinally and transversely of the chain and trolley bracket assembly, and thus eliminates or at least minimizes stress concentrations resulting from the interlocking engagement.

A modified trolley bracket 12A is shown in FIGS. 7 and 8. The construction of this modified bracket is generally similar to the construction previously described except that the channel-shaped grooves 46A are relatively deeper, the shoulders 48A are relatively wider, and the recess 50A is an indentation forged in the outer face 56 and having sides 58 which compliment the sides 60 (FIGS. 4 and 6) of the bosses 28 on the center link. The recess 50A is symmetrical to the longitudinal centerline 54 of the bracket 12A and holes 62 for the bolts 18 are located on the centerline 54 above and below the recess.

In order to provide the improved chain and trolley bracket assembly of the invention described above, it is only necessary to modify a conventional chain center link by forming the bosses 28 on the side portions 20 thereof, and to modify conventional trolley brackets by forming the recesses 50 and 50A thereon. A standard form of attachment member 16 is used with the modified center link 10 and brackets 12, 14 or 12A; and, the modified brackets 12, 14 or 12A can be used with a standard, unmodified center link.

The alternative chain and trolley bracket assembly illustrated in FIGS. 9-11 employs the same center link 10 having the bosses 28, with different trolley brackets 62 and 64 and a different attachment member 66. As best shown in FIG. 11, the attachment member 66 is formed with a stem portion 68 extending from the end 69 to a pair of transversely projecting shoulders 70 and having a pair of opposed sides 72 and 73 which are spaced apart a distance slightly less than the transverse dimension of the open central portion 26 of the center link 10. A groove 74, provided in each of the sides 72 and 73 from the stem end 69 to shoulders 70, forms a recess which is engaged by one of the bosses 28 of the center link 10 when the stem 68 extends through the open center portion 20 of the link 10, as shown.

Each of the trolley brackets 62 and 64 has a base portion 76 which is connected to the stem 68 of the attachment member 66 on one side of the center link 10 by bolts 77, and which terminates in an end surface 78 engageable by one side 80 of the center link 10. The other side 81 of the center link is engageable by the shoulders 70 at the inner end of the stem portion 68.

As appears from FIGS. 8 and 10, the grooves 74 in the attachment member 66 are located medially between the side edges 82 and 83 thereof and also medially between the side edges 84 and 85 of the base portions 76 of the trolley brackets 62 and 64.

The trolley brackets 62 and 64 and the attachment member 66 can be used with a standard center link not provided with the bosses 28.

What is claimed is:

1. In a conveyor chain and trolley assembly consisting of a chain center link having pairs of side and end portions symmetrically formed about longitudinal and transverse center lines and defining an open central portion, a pair of trolley brackets each having a base portion, and an attachment member mounted between and connected to the base portions of the pair of trolley brackets, at least one of the elements—consisting of the base portions of the pair of trolley brackets as an element and the attachment member as another element—extending through the open central portion of the center link and having transversely projecting shoulders engaging the side portions of the center link, the improvement wherein:

each of the pair of side portions of the center link is provided with one of a pair of bosses, said bosses projecting from the pair of side portions into the open central portion, said bosses being located medially longitudinally of the center link and having parallel inner faces opposed to each other in spaced relation transversely of the center link; and,
    recess means complementing said bosses are provided on one of said elements for interlocking the center link therewith when said elements are connected, said recess means being located medially between the side edges of said one element.

2. A conveyor chain and trolley assembly according to claim 1, wherein both of said elements extend through the open central portion of the center link and said recess means are provided on the element consisting of the base portions of the trolley brackets, said recess means being positioned in engagement with said bosses by the other element consisting of the attachment member.

3. A conveyor chain and trolley assembly according to claim 2, wherein said recess means are symmetrical to a longitudinal center line of each of the trolley brackets and the attachment member is connected to the pair of trolley brackets by bolts located on said center line and on opposite sides of the recess means.

4. A conveyor chain and trolley assembly according to claim 3, wherein the base portions of the trolley brackets have transversely extending shoulders spaced apart along said longitudinal center line and forming grooves adapted to receive the side portions of the center link, said shoulders being symmetrical to such longitudinal center line and extending substantially from the recess means to the side edges of the base portions.

5. A conveyor chain and trolley assembly according to claim 1, wherein the element consisting of the attachment member is formed with a stem portion having oppositely facing parallel sides spaced apart a distance slightly less than the transverse dimension of the open central portion of the center link, and the recess means comprises a groove in each of said oppositely facing sides, said stem portion of the attachment member extending through the open central portion of the center link with the bosses of the center link engaged in said grooves.

6. A conveyor chain and trolley assembly according to claim 5, wherein the base portions of the trolley brackets are connected to said stem portion of the attachment member on one side of the center link and have terminal surfaces engageable by said one side of the center link, and said end portion of the attachment member has transversely extending shoulders engageable by the opposite side of the center link.

7. In a conveyor chain center link having pairs of side and end portions symmetrically formed about longitudinal and transverse center lines and defining an open central portion adapted to receive at least one of the elements consisting of a pair of trolley brackets as an element and an attachment member as another element, the improvement wherein:

the side portions of the center link are provided with boss means for interlocking engagement with complimentary recess means on one of said elements, said boss means comprising a pair of bosses one of which projects from each of said pair of side portions into said open central portion, said bosses being located medially longitudinally of the center link and having parallel inner faces opposed to each other in spaced relation transversely of the center link.

8. In a conveyor trolley attachment member adapted to be connected to a pair of trolley brackets and to a conveyor chain center link having pairs of side and end portions symmetrically formed about longitudinal and transverse center lines and defining an open central portion, said attachment member being formed with a stem end and a stem portion adapted to extend through said open central portion and having oppositely facing parallel sides spaced apart a distance slightly less than the transverse dimension of said open central portion, the improvement wherein:

each of said sides of the stem portion is provided with recess means for interlocking engagement with one of a pair of complimentary boss means one of which pair of boss means projects from each side portion of the center link into the open central portion thereof, said recess means comprising a groove extending from the stem end along the stem portion of the attachment member and located medially between the side edges thereof.

* * * * *

UNITED STATES PATENT AND TRADEMARK OFFICE
CERTIFICATE OF CORRECTION

PATENT NO. : 4,262,796
DATED : April 21, 1981
INVENTOR(S) : CLAYTON C. McDONALD

It is certified that error appears in the above—identified patent and that said Letters Patent is hereby corrected as shown below:

Column 1, line 7, "trolley" should read -- trolleys --;

Column 1, line 62, "as" should read -- at --;

Column 3, line 60, delete the period (.);

Column 3, line 61, delete "shaped";

Column 4, line 49, "and" should read -- or --;

Column 6, line 21, "end" should read -- stem --.

Signed and Sealed this

Thirtieth Day of June 1981

[SEAL]

Attest:

RENE D. TEGTMEYER

Attesting Officer

Acting Commissioner of Patents and Trademarks